(12) United States Patent
Ashimori et al.

(10) Patent No.: US 9,347,544 B2
(45) Date of Patent: May 24, 2016

(54) TRANSMISSION MOUNTING STRUCTURE

(71) Applicant: HONDA MOTOR CO., LTD., Tokyo (JP)

(72) Inventors: Takashi Ashimori, Saitama (JP); Mitsuo Kimura, Saitama (JP); Yoshimi Hirano, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 0 days.

(21) Appl. No.: 14/536,204

(22) Filed: Nov. 7, 2014

(65) Prior Publication Data
US 2015/0129346 A1 May 14, 2015

(30) Foreign Application Priority Data
Nov. 8, 2013 (JP) ................................. 2013-231781

(51) Int. Cl.
*F16H 57/025* (2012.01)
*B60K 17/08* (2006.01)
*B60K 5/12* (2006.01)
*F16H 57/02* (2012.01)
*B60K 17/16* (2006.01)

(52) U.S. Cl.
CPC ............ *F16H 57/025* (2013.01); *B60K 5/1216* (2013.01); *B60K 17/08* (2013.01); *B60K 17/165* (2013.01); *F16H 2057/02043* (2013.01)

(58) Field of Classification Search
CPC ...... F16H 57/025; B60K 17/00; B60K 17/06; B60K 17/08; B60K 17/16; Y10T 74/2186
USPC .............. 180/344, 346, 377; 74/606 R
See application file for complete search history.

(56) References Cited

U.S. PATENT DOCUMENTS

| 2,925,740 | A | * | 2/1960 | Chung | ................... | F16H 57/025 248/666 |
| 4,534,440 | A | * | 8/1985 | Sekizaki | ................ | B62K 5/027 180/215 |
| 5,868,215 | A | * | 2/1999 | Kawada | ................. | B60K 17/24 180/381 |
| 5,988,947 | A | * | 11/1999 | Bruso | ....................... | B09C 1/02 110/241 |
| 8,584,789 | B2 | * | 11/2013 | Dusi | .................... | B60K 5/1216 180/300 |
| 2009/0247342 | A1 | * | 10/2009 | Matsumoto | ............... | F16H 3/60 475/12 |

FOREIGN PATENT DOCUMENTS

JP    4-29425 U    3/1992

* cited by examiner

*Primary Examiner* — Keith Frisby
(74) *Attorney, Agent, or Firm* — Westerman, Hattori, Daniels & Adrian, LLP

(57) ABSTRACT

The present invention provides a transmission mounting structure. A transmission case is constructed by connecting a clutch case, a case main body, and an end case, which are split in the direction of a rotational center axis. The clutch case and the case main body are provided with projecting portions. The projecting portions are connected by co-fastening bolts. Fixtures are secured to the projecting portions by mounting bolts, which are installed from the direction of the rotational center axis. The transmission is installed to a vehicle through the intermediary of supports. The projecting portions are co-fastened by the mounting bolts.

6 Claims, 3 Drawing Sheets

TRANSMISSION MOUNTING STRUCTURE

BACKGROUND OF THE INVENTION

1. Field of the Invention

The present invention relates to a transmission mounting structure for mounting a transmission in a vehicle.

2. Description of the Related Art

Hitherto, there has been known a mounting structure for mounting a transmission in a vehicle by using an L-shaped mounting member (refer to, for example, Utility Model Registration No. 2530847). According to the mounting structure described in Utility Model Registration No. 2530847, an L-shaped mounting member is provided with a stiffener to be connected to an engine so as to enhance the rigidity of connection between a transmission and an engine.

In a parallel shaft type transmission or the like, if a transmission case is comprised of a plurality of split cases connected in an axial direction, then a thrust force in the axial direction is generated by the use of a helical gear, causing the application of a force in a direction that tends to open the connected portions of the split cases constituting the transmission case.

SUMMARY OF THE INVENTION

The present invention has been made toward solving the problem described above, and an object of the invention is to provide a transmission mounting structure capable of preventing the connected portions of a transmission case, which is comprised of a plurality of split cases, from opening.

To this end, the present invention provides a transmission mounting structure for mounting a transmission in a vehicle, wherein the transmission has an input section to which the power of a drive source is transmitted, a transmission case that rotatably supports the input section, and an output section disposed in parallel to or concentric with a rotational center axis of the input section, and the transmission changes the rotational speed of the input section and outputs the changed rotational speed from the output section, wherein the transmission case is configured by connecting a plurality of split cases that are split in a direction of the rotational center axis, the split cases have projecting portions that project outward in a radial direction at portions where the split cases that are adjacent to each other are connected, the projecting portions of the adjacent split cases are overlapped and connected by a co-fastening bolt, the transmission is mounted in a vehicle through an intermediary of a support, which is fixed by a mounting bolt attached to the projecting portions from the direction of the rotational center axis, and the overlapped projecting portions are co-fastened by the mounting bolt.

According to the present invention, the split cases are co-fastened by the mounting bolt, so that even if a force in the thrust direction is generated in the transmission case, it is possible to prevent the split cases from separating. In other words, since the co-fastening bolt can be used as the mounting bolt, the number of bolts can be reduced, as compared with a conventional mounting structure which requires the use of a separate mounting bolt.

In the present invention, a pair of right and left projecting portions can be provided at a lower level than the input section such that the pair of the right and left projecting portions holds the input section therebetween. According to this configuration, the input section is positioned between the projecting portions, thus allowing the transmission to be mounted in the vehicle in a balanced manner.

Further, in the case where a drive source is installed to the vehicle at the upper portion thereof, the foregoing configuration, that is, providing the pair of the right and left projecting portions at the lower level than the input section and holding the input section therebetween, is particularly preferred. According to this configuration, the line that connects the position where the drive source is installed to the vehicle and the position where the transmission is installed to the vehicle passes through the transmission, thus making it possible to mount the transmission in the vehicle in a further balanced manner.

Further, in the present invention, a differential gear, to which the power from the output section is transmitted, may be provided, and the differential gear may be configured to take a rotational center axis in a direction orthogonal to the axis of the output section, and the center axis of the differential gear, to which the power from the output section is transmitted, may intersect with a straight line that connects the position at which the drive source is installed to the vehicle and the position of the mounting bolt. According to this configuration, the line that connects the position at which the drive source is installed to the vehicle and the position at which the transmission is installed to the vehicle is positioned to intersect with the center axis of the differential gear, so that the transmission can be mounted in the vehicle in a further balanced manner.

Further, in the present invention, the output section is positioned at a higher level than the input section, allowing two supports to be disposed such that each of the supports is equally distanced from the axial center of an input shaft. This makes it possible to mount the transmission in the vehicle in a further balanced manner.

DESCRIPTION OF THE PREFERRED EMBODIMENTS

Figure 1:
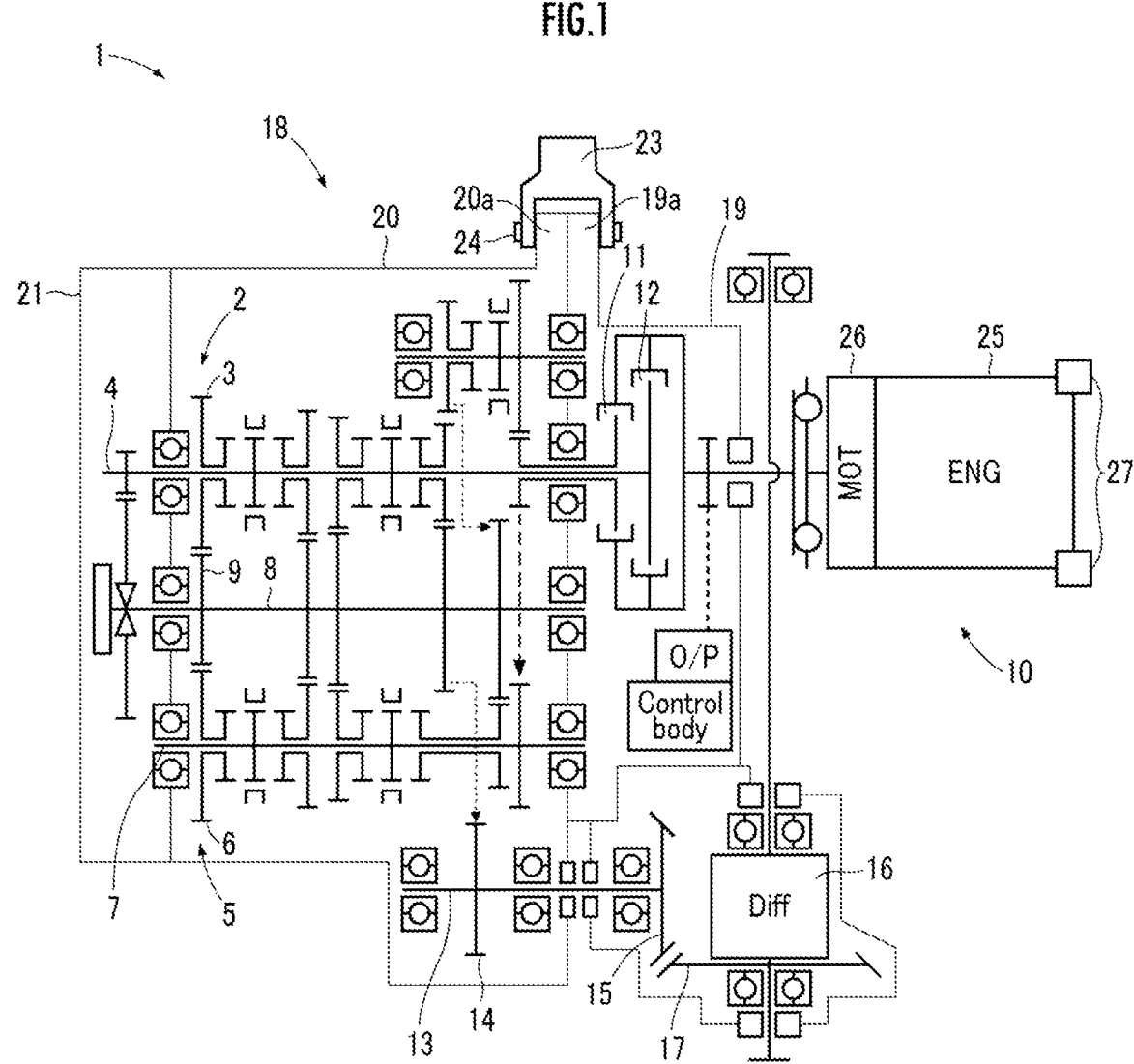
FIG. 1 is a skeleton diagram schematically illustrating an embodiment of the transmission mounting structure in accordance with the present invention.

Referring to FIG. 1 to FIG. 5, an embodiment to which the transmission mounting structure in accordance with the present invention has been applied will be described. As illustrated in FIG. 1, a transmission 1 in the present embodiment is a so-called dual clutch transmission, and provided with a first input shaft 4 that journals a drive gear 3 of a gear train 2 establishing odd-numbered stages, a second input shaft 7 that journals a drive gear 6 of a gear train 5 establishing even-numbered stages, and an output shaft 8 disposed in parallel to the first input shaft 4 and the second input shaft 7.

The drive gears 3 and 6 rotatably journalled by the first input shaft 4 and the second input shaft 7, respectively, are selectively fixed to the first input shaft 4 or the second input shaft 7, whichever is appropriate, by a synchromesh mechanism. The first input shaft 4 is disposed to be concentric with the rotational center axis of a drive source 10. In the present embodiment, the first input shaft 4 corresponds to the input section in the present invention, and the output shaft 8 corresponds to the output section in the present invention. Further, the drive source 10 is disposed behind a passenger compartment (cabin) of the vehicle and longitudinally placed such that the rotating shaft (crankshaft) of the drive source 10 is oriented in the same direction as the traveling direction of the vehicle.

Driven gears 9, which mesh with the drive gears 3 and 6, respectively, of the gear trains 2 and 5, are journalled by the output shaft 8. The single driven gear 9 meshes with the single drive gear 3 of the gear train 2 of odd-numbered stages and also meshes with the single drive gear 6 of the gear train 5 of even-numbered stages. Each of the gear trains 2 and 5 is composed of a helical gear and develops a thrust force in the axial direction when a drive force is transmitted between the first input shaft 4 or the second input shaft 7 and the output shaft 8.

The drive force of the drive source 10 is transmitted to the first input shaft 4 through the intermediary of a first clutch 11. The drive force of the drive source 10 is transmitted to the second input shaft 7 through the intermediary of a second clutch 12.

One of the driven gears 9 journalled by the output shaft 8 functions also as an output gear, and a first intermediate gear 14, which is fixed to an intermediate shaft 13, meshes with this driven gear 9. A second intermediate gear 15 composed of a bevel gear is fixed to the intermediate shaft 13. The second intermediate gear 15 meshes with an external tooth 17, which is provided at a differential gear 16 and which is also composed of a bevel gear. The engagement between the second intermediate gear 15 and the external tooth 17 converts the rotation of the intermediate shaft 13 into the rotation of the differential gear 16 having a rotating axis that is orthogonal to the intermediate shaft 13. In other words, the rotational center axis of the differential gear 16 is orthogonal also to the axial direction of the output shaft 8.

The transmission 1 according to the present embodiment changes speed by selecting a gear train, through which the drive force is to be transmitted, by the synchromesh mechanism. Further, while the power is being transmitted through one of the input shafts 4 and 7 through one of the clutches 11 and 12, a gear train of the other of the input shafts 7 and 4 corresponding to a transmission stage expected to be used next is selected by the synchromesh mechanism, thus permitting a smooth speed change simply by switching the connection/disconnection of the clutch 11 or 12.

The first input shaft 4, the second input shaft 7, and the output shaft 8 are rotatably journalled by a transmission case 18. The transmission case 18 is composed of three split cases. A first split case is a clutch case 19 housing the first clutch 11, the second clutch 12, and the differential gear 16. A second split case is a case main body 20, which is connected to the clutch case 19 and which covers the surroundings of the first input shaft 4, the second input shaft 7, and the output shaft 8. A third spilt case is an end case 21 that closes the end opening of the case main body 20.

Projecting portions 19a and 20a that project outward in a radial direction are provided between the clutch case 19 and the case main body 20, which are split cases. The projecting portions 19a and 20a are overlapped and fastened by co-fastening bolts 22 thereby to connect the clutch case 19 and the case main body 20.

A pair of right and left supports 23 is installed below the projecting portions 19a and 20a by mounting bolts 24. The supports 23 are formed in a substantially U shape and installed such that the supports 23 sandwich the projecting portions 19a and 20a from the axial direction of the input shafts 4 and 7. Further, the mounting bolts 24 are formed to be slightly longer than the co-fastening bolts 22 so as to co-fasten not only the projecting portions 19a and 20a but also the substantially U-shaped supports 23. Further, the supports 23 are secured to a subframe attached to a monocoque of a vehicle (vehicle body), which is not illustrated.

Figure 5:
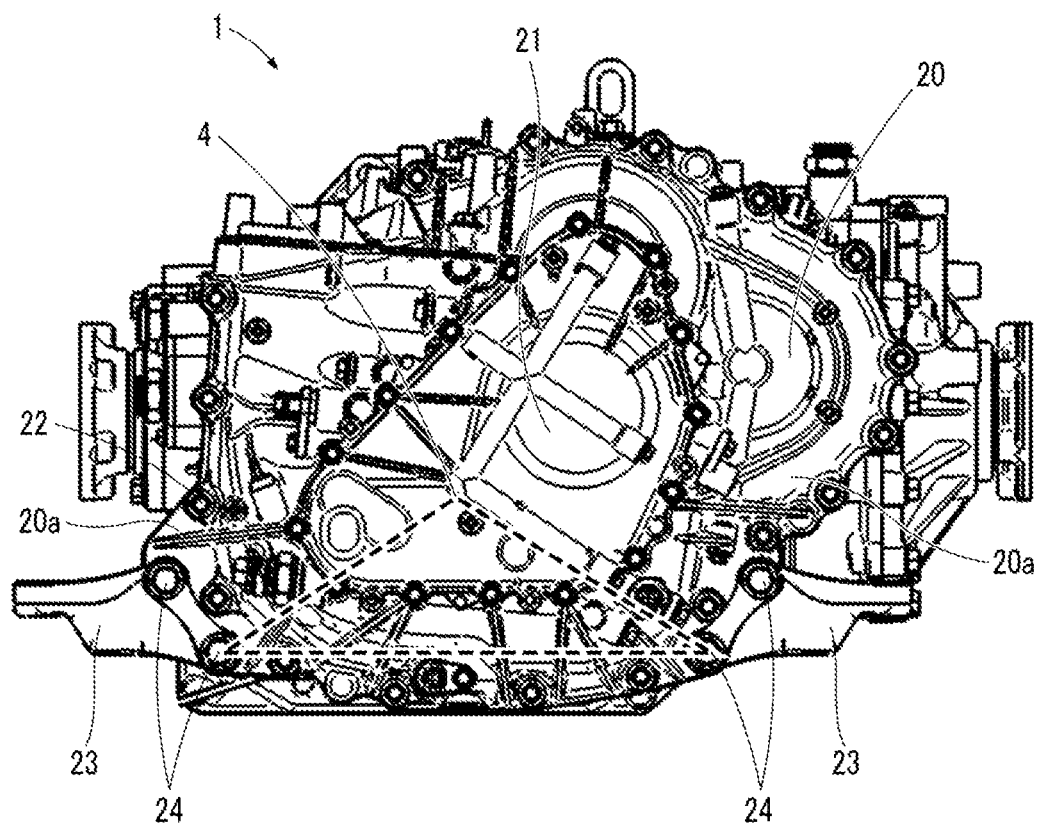
FIG. 5 is an explanatory diagram illustrating a positional relationship between the support and an input shaft in the present embodiment.

Further, as illustrated in FIG. 5, the pair of right and left supports 23 is disposed such that the supports 23 sandwich the first input shaft 4 and are equidistant from the first input shaft 4, which is concentric with the rotational center axis of the drive source 10. This makes it possible to mount the transmission 1 in the vehicle in a balanced manner.

The drive source 10 is composed of a combination of an engine 25, which is an internal-combustion engine, and an electric motor 26. The drive source 10 outputs a drive force from one or both of the engine 25 and the electric motor 26, as appropriate, according to the traveling condition of the vehicle. The drive source 10 is connected to the clutch case 19.

Figure 2:
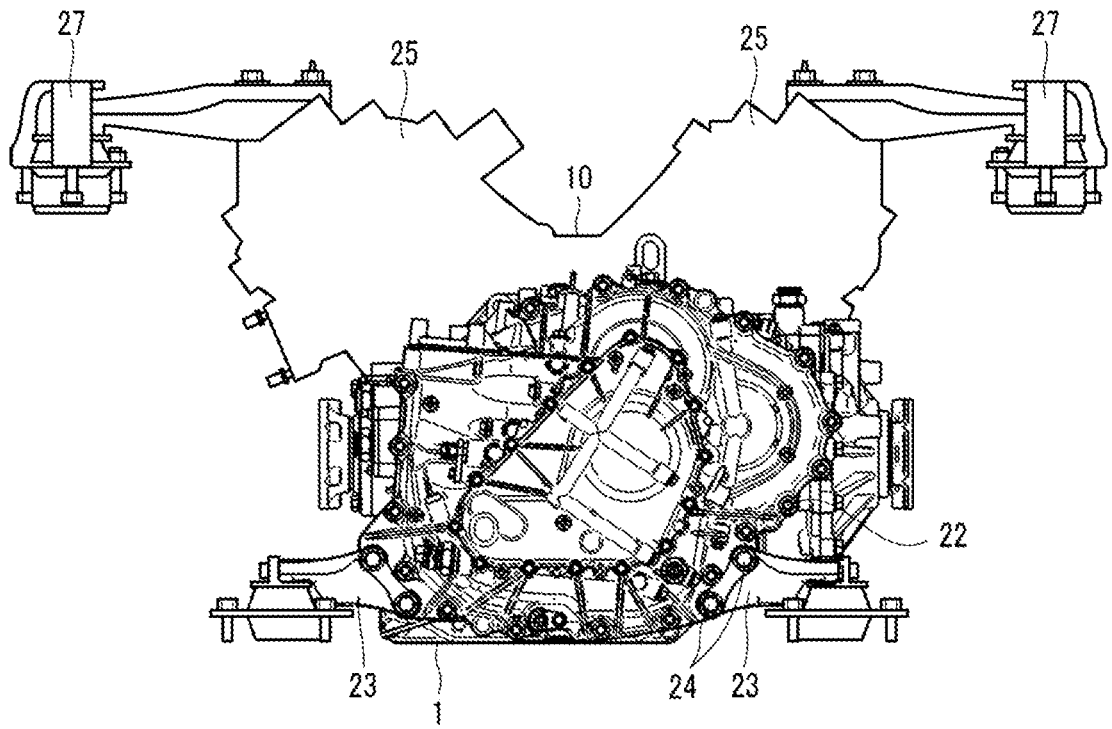
FIG. 2 is an explanatory diagram illustrating a transmission and a drive source in the present embodiment observed from a transmission side.

As illustrated in FIG. 2, the drive source 10 is provided with a pair of right and left fixtures 27 at upper portions thereof. The fixtures 27 are attached to the vehicle. Thus, the drive source 10 is installed to the vehicle through the fixtures 27.

Figure 3:
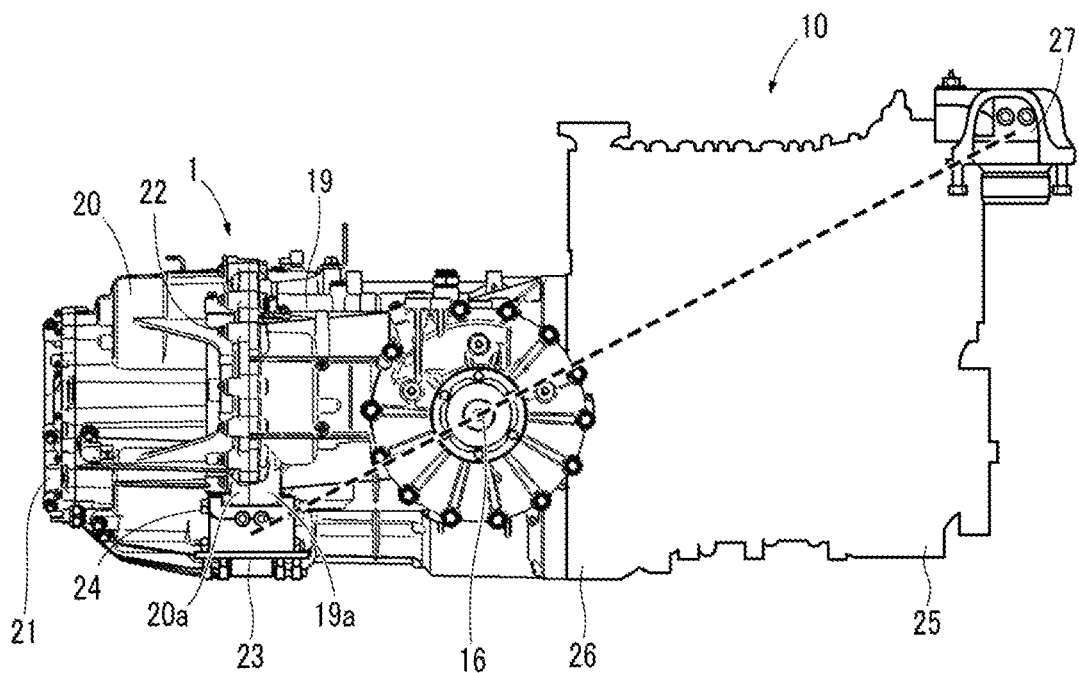
FIG. 3 is an explanatory diagram illustrating the transmission and the drive source in the present embodiment observed sideways.
Figure 4:
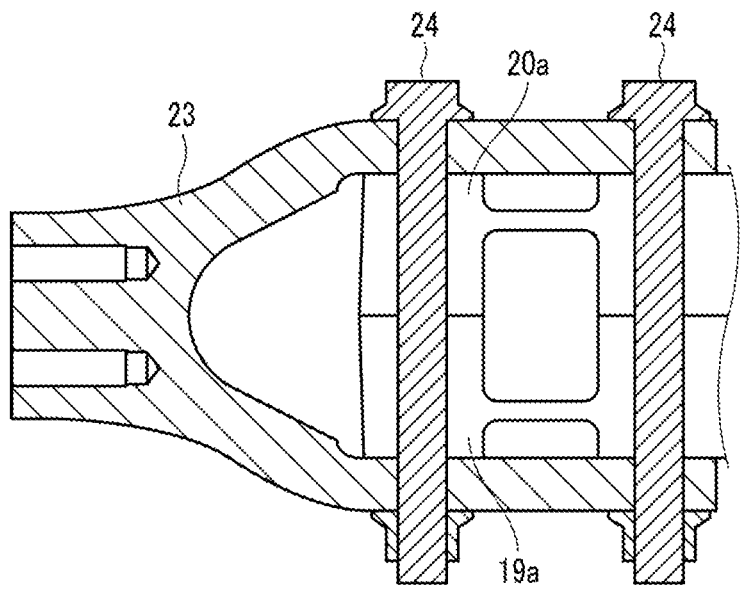
FIG. 4 is a sectional view illustrating a support in the present embodiment.

As illustrated in FIG. 3, the supports 23 and the fixtures 27 are disposed such that the straight line that connects the fixtures 27 of the drive source 10 and the supports 23 supporting the transmission 1 intersects with the center axis of the differential gear 16. This makes it possible to support the drive source 10 and the transmission 1 in a balanced manner.

According to the transmission 1 in the present embodiment, the clutch case 19 and the case main body 20, which are split cases, are co-fastened together with the supports 23 by the mounting bolts 24. Hence, even if a force in the thrust direction is generated in the transmission case 18, it is possible to prevent the clutch case 19 and the case main body 20 from separating from each other. In other words, the co-fastening bolts can be used as the mounting bolts 24, thus permitting a reduced number of bolts, as compared with a conventional mounting structure that requires the use of separate mounting bolts.

Further, in the present embodiment, an arrangement has been adjusted such that the center of gravity is positioned at the center in the longitudinal direction and the vertical direction in a state in which the drive source 10 and the transmission 1 are connected by the fixtures 27 at the upper portions of the drive source 10 side and the supports 23 of the transmission 1. Further, the transmission 1 is located at a lower level than the drive source 10, so that if the transmission 1 is supported at a higher level and the drive source 10 is fixed at a lower level, then the supports of the transmission 1 would have to be extended to the position of the fixtures 27 that fix the drive source 10 illustrated in FIG. 2, making the supports larger than the fixtures 27 illustrated in FIG. 2.

In the present embodiment, the supports 23, which support and fix the transmission 1 to the vehicle, are attached to the lower portions of the transmission 1, while the fixtures 27, which fix the drive source 10 to the vehicle, are attached to the upper portions of the drive source 10, thus allowing the supports 23 and the fixtures 27 to be compact as a whole.

In the present embodiment, the description has been given by using the so-called dual clutch transmission as the transmission 1; however, the transmission in the present invention is not limited thereto. For example, the same operational advantage for preventing adjacent split cases from separating will be obtained also in a different type of transmission (e.g. a planetary gear mechanism type transmission in which an input shaft and an output shaft are concentrically disposed) insofar as the transmission has a transmission case composed of a plurality of split cases, which are split in the direction of the rotational center axis of the input shaft, and is subjected to a force applied in the direction of the rotational center axis, tending to open the gaps between the split cases, due to the engagement between helical gears or the like.

What is claimed is:

1. A transmission mounting structure for mounting a transmission in a vehicle, wherein the transmission comprises:
    an input section to which a power of a drive source is transmitted;
    a transmission case that rotatably supports the input section; and
    an output section disposed in parallel to or concentric with a rotational center axis of the input section, and
    the transmission is configured to change a gear ratio and is configured to change a rotational speed of the input section and output the changed rotational speed from the output section;
    the transmission case is configured by connecting a plurality of split cases that are split in a direction of the rotational center axis;
    the split cases include projecting portions that project outward in a radial direction at portions where the split cases that are adjacent to each other are connected, and the projecting portions of the adjacent split cases are overlapped and connected by a co-fastening bolt;
    the transmission is mounted in a vehicle through an intermediary of a support, which is fixed by a mounting bolt attached to the projecting portions from the direction of the rotational center axis; and
    the overlapped projecting portions are co-fastened by the mounting bolt.

2. The transmission mounting structure according to claim 1,
    wherein the projecting portions are located lower than the input section and provided in a form of paired right and left portions that sandwich the input section.

3. The transmission mounting structure according to claim 2,
    wherein an upper portion of the drive source is attached to the vehicle.

4. The transmission mounting structure according to claim 3,
    wherein a differential gear, to which a power from the output section is transmitted, is provided,
    the differential gear is configured to have a rotational center axis in a direction orthogonal to an axis of the output section, and
    the center axis of the differential gear, to which the power from the output section is transmitted, intersects with a straight line that connects a position at which the drive source is installed to the vehicle and a position of the mounting bolt.

5. The transmission mounting structure according to claim 4,
    wherein the output section is positioned higher than the input section, and
    the support is a pair of right and left supports disposed such that each thereof is equidistant from the rotational center axis of the input section.

6. The transmission mounting structure according to claim 1,
    wherein the output section is positioned higher than the input section, and
    the support is a pair of right and left supports disposed such that each thereof is equidistant from the rotational center axis of the input section.

* * * * *